United States Patent
Lee et al.

(10) Patent No.: US 10,122,595 B2
(45) Date of Patent: *Nov. 6, 2018

(54) SYSTEM AND METHOD FOR SUPPORTING SERVICE LEVEL QUORUM IN A DATA GRID CLUSTER

(71) Applicant: Oracle International Corporation, Redwood Shores, CA (US)

(72) Inventors: Robert H. Lee, San Carlos, CA (US); Mark Falco, Burlington, CA (US); Gene Glezyer, Lexington, MA (US); Cameron Purdy, Lexington, MA (US)

(73) Assignee: Orcale International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,648

(22) Filed: Dec. 30, 2015

(65) Prior Publication Data
US 2016/0119197 A1 Apr. 28, 2016

Related U.S. Application Data

(63) Continuation of application No. 13/352,209, filed on Jan. 17, 2012, now Pat. No. 9,262,229.
(Continued)

(51) Int. Cl.
*G06F 15/16* (2006.01)
*H04L 12/24* (2006.01)
(Continued)

(52) U.S. Cl.
CPC ........ *H04L 41/5054* (2013.01); *G06F 9/5061* (2013.01); *G06F 11/1425* (2013.01);
(Continued)

(58) Field of Classification Search
CPC ........... G06F 11/1425; G06F 2209/505; G06F 9/5061; H04L 41/0893; H04L 67/1046
See application file for complete search history.

(56) References Cited

U.S. PATENT DOCUMENTS 5,784,569 A 7/1998 Miller
5,819,272 A 10/1998 Benson
(Continued)

OTHER PUBLICATIONS

European Patent Office, International Searching Authority, International Search Report and Written Opinion dated Feb. 18, 2015 for International Application No. PCT/US2014/068904, 13 Pages.
(Continued)

*Primary Examiner* — Shean Tokuta
(74) *Attorney, Agent, or Firm* — Tucker Ellis LLP (57) ABSTRACT

A system and method is described for use with a data grid cluster, for supporting service level quorum in the data grid cluster. The data grid cluster includes a plurality of cluster nodes that support performing at least one service action. A quorum policy, defined in a cache configuration file associated with the data grid cluster, can specify a minimum number of service members that are required in the data grid cluster for performing the service action. The data grid cluster uses the quorum policy to determine whether the service action is allowed to be performed, based on a present state of the plurality of cluster nodes in the data grid cluster.

20 Claims, 8 Drawing Sheets

Related U.S. Application Data (60) Provisional application No. 61/437,546, filed on Jan. 28, 2011.

(51) Int. Cl.
*G06F 9/50* (2006.01)
*G06F 11/14* (2006.01)
*H04L 29/08* (2006.01)

(52) U.S. Cl.
CPC ............. *H04L 67/10* (2013.01); *H04L 67/16* (2013.01); *G06F 2209/505* (2013.01)

(56) References Cited

U.S. PATENT DOCUMENTS

| | | | | |
|---|---|---|---|---|
| 5,933,818 | A * | 8/1999 | Kasravi | G06K 9/622 706/12 |
| 5,940,367 | A | 8/1999 | Antonov | |
| 5,991,894 | A | 11/1999 | Lee | |
| 5,999,712 | A * | 12/1999 | Moiin | G06F 9/5061 370/254 |
| 6,182,139 | B1 | 1/2001 | Brendel | |
| 6,377,993 | B1 | 4/2002 | Brandt | |
| 6,453,426 | B1 * | 9/2002 | Gamache | G06F 11/1417 709/249 |
| 6,487,622 | B1 * | 11/2002 | Coskrey, IV | H04L 49/90 710/240 |
| 6,490,620 | B1 | 12/2002 | Ditmer | |
| 6,553,389 | B1 | 4/2003 | Golding | |
| 6,605,120 | B1 * | 8/2003 | Fields | G06F 17/30867 707/E17.109 |
| 6,615,258 | B1 | 9/2003 | Barry | |
| 6,631,402 | B1 | 10/2003 | Devine | |
| 6,693,874 | B1 | 2/2004 | Shaffer | |
| 6,714,979 | B1 | 3/2004 | Brandt | |
| 6,871,222 | B1 * | 3/2005 | Frank | G06F 11/1425 707/E17.01 |
| 6,968,571 | B2 | 11/2005 | Devine | |
| 7,020,695 | B1 * | 3/2006 | Kundu | H04L 67/1097 709/223 |
| 7,114,083 | B2 | 9/2006 | Devine | |
| 7,139,925 | B2 | 11/2006 | Dinker | |
| 7,266,822 | B1 | 9/2007 | Boudnik | |
| 7,328,237 | B1 | 2/2008 | Thubert | |
| 7,376,953 | B2 | 5/2008 | Togasaki | |
| 7,451,359 | B1 * | 11/2008 | Coekaerts | G06F 11/0709 709/223 |
| 7,464,378 | B1 * | 12/2008 | Limaye | G06F 9/5061 714/100 |
| 7,543,046 | B1 * | 6/2009 | Bae | G06F 15/16 709/220 |
| 7,613,774 | B1 * | 11/2009 | Caronni | H04L 67/104 709/205 |
| 7,640,339 | B1 * | 12/2009 | Caronni | H04L 43/0817 709/220 |
| 7,698,390 | B1 * | 4/2010 | Harkness | G06F 11/1425 709/201 |
| 7,720,971 | B2 | 5/2010 | Moutafov | |
| 7,739,677 | B1 * | 6/2010 | Kekre | G06F 11/202 709/214 |
| 7,792,977 | B1 * | 9/2010 | Brower | G06F 9/468 709/229 |
| 7,814,248 | B2 | 10/2010 | Fong | |
| 7,917,596 | B2 | 3/2011 | Chan | |
| 7,953,861 | B2 | 5/2011 | Yardley | |
| 7,975,288 | B2 * | 7/2011 | Viavant | G06F 21/40 705/51 |
| 7,979,457 | B1 * | 7/2011 | Garman | G06F 17/30864 705/26.8 |
| 8,195,835 | B2 | 6/2012 | Ansari | |
| 8,209,307 | B2 | 6/2012 | Erofeev | |
| 8,312,439 | B2 | 11/2012 | Kielstra | |
| 8,401,994 | B2 | 3/2013 | Hoang | |
| 8,595,714 | B1 * | 11/2013 | Hamer | G06F 8/65 709/201 |
| 2002/0035559 | A1 * | 3/2002 | Crowe | G06F 17/30321 |
| 2002/0042693 | A1 * | 4/2002 | Kampe | H04L 41/0618 702/186 |
| 2002/0073223 | A1 | 6/2002 | Darnell | |
| 2002/0078312 | A1 * | 6/2002 | Wang-Knop | G06F 17/30067 711/150 |
| 2003/0023898 | A1 | 1/2003 | Jacobs | |
| 2003/0046286 | A1 | 3/2003 | Jacobs | |
| 2003/0120715 | A1 * | 6/2003 | Johnson | G06F 17/30224 709/201 |
| 2003/0135476 | A1 * | 7/2003 | Holland | G06Q 10/04 706/47 |
| 2003/0187927 | A1 * | 10/2003 | Winchell | G06F 11/1492 709/204 |
| 2003/0191795 | A1 | 10/2003 | Bernardin | |
| 2004/0059805 | A1 | 3/2004 | Dinker | |
| 2004/0153558 | A1 * | 8/2004 | Gunduc | G06F 9/5055 709/229 |
| 2004/0153615 | A1 | 8/2004 | Koning | |
| 2004/0176968 | A1 * | 9/2004 | Syed | G06Q 10/06375 705/7.37 |
| 2004/0179471 | A1 | 9/2004 | Mekkittikul | |
| 2004/0193459 | A1 * | 9/2004 | Delaney | G06Q 10/10 707/781 |
| 2004/0205148 | A1 * | 10/2004 | Bae | G06F 11/2289 709/213 |
| 2004/0225657 | A1 * | 11/2004 | Sarkar | G06Q 10/06 |
| 2004/0267897 | A1 * | 12/2004 | Hill | G06F 9/505 709/217 |
| 2005/0021690 | A1 * | 1/2005 | Peddada | G06F 9/5055 709/220 |
| 2005/0021737 | A1 | 1/2005 | Ellison | |
| 2005/0028139 | A1 * | 2/2005 | Togahara | G06F 8/38 717/114 |
| 2005/0083834 | A1 | 4/2005 | Dunagan | |
| 2005/0097185 | A1 | 5/2005 | Gibson | |
| 2005/0138460 | A1 | 6/2005 | McCain | |
| 2005/0160315 | A1 * | 7/2005 | Chandrasekaran | G06F 11/1474 714/15 |
| 2005/0193056 | A1 | 9/2005 | Schaefer | |
| 2005/0193392 | A1 * | 9/2005 | Carusi | G06F 9/465 719/315 |
| 2005/0257217 | A1 * | 11/2005 | Woollen | G06F 8/61 717/177 |
| 2006/0048020 | A1 * | 3/2006 | Newport | G06F 9/5061 714/49 |
| 2006/0095573 | A1 | 5/2006 | Carle | |
| 2007/0016822 | A1 * | 1/2007 | Rao | G06F 9/5061 714/4.11 |
| 2007/0118693 | A1 | 5/2007 | Brannon | |
| 2007/0124348 | A1 * | 5/2007 | Claborn | G06F 11/2025 |
| 2007/0140110 | A1 * | 6/2007 | Kaler | H04L 67/104 370/218 |
| 2007/0174160 | A1 | 7/2007 | Solberg | |
| 2007/0198700 | A1 * | 8/2007 | Vivian | G06F 11/2097 709/224 |
| 2007/0237072 | A1 | 10/2007 | Scholl | |
| 2007/0260714 | A1 | 11/2007 | Kalmuk | |
| 2007/0271584 | A1 | 11/2007 | Anderson | |
| 2008/0077622 | A1 | 3/2008 | Keith | |
| 2008/0133531 | A1 * | 6/2008 | Baskerville | G06F 21/6254 |
| 2008/0141336 | A1 * | 6/2008 | Haller | G06F 21/62 726/1 |
| 2008/0183876 | A1 * | 7/2008 | Duvur | H04L 67/1008 709/228 |
| 2008/0184201 | A1 * | 7/2008 | Burns | G06F 9/44505 717/121 |
| 2008/0276231 | A1 * | 11/2008 | Huang | G06F 8/71 717/145 |
| 2008/0281959 | A1 * | 11/2008 | Robertson | H04L 43/0817 709/224 |
| 2008/0313293 | A1 * | 12/2008 | Jacobs | H04L 12/1868 709/206 |

(56) References Cited

U.S. PATENT DOCUMENTS

| | | | |
|---|---|---|---|
| 2009/0177914 A1* | 7/2009 | Winchell | G06F 11/1492 714/4.1 |
| 2009/0228321 A1* | 9/2009 | Srinivasan | G06Q 10/109 705/7.19 |
| 2009/0265449 A1 | 10/2009 | Krishnappa | |
| 2009/0320005 A1* | 12/2009 | Toub | G06F 8/45 717/149 |
| 2010/0064341 A1* | 3/2010 | Aldera | H04L 63/102 726/1 |
| 2010/0128732 A1 | 5/2010 | Jiang | |
| 2010/0211931 A1 | 8/2010 | Levanoni | |
| 2010/0250321 A1* | 9/2010 | Farrell | G06Q 10/109 705/7.19 |
| 2010/0268571 A1* | 10/2010 | Davies | G06Q 10/06311 705/7.13 |
| 2010/0268749 A1* | 10/2010 | Seitz | G06F 9/5016 707/803 |
| 2010/0312861 A1 | 12/2010 | Kolhi | |
| 2011/0041006 A1 | 2/2011 | Fowler | |
| 2011/0071981 A1 | 3/2011 | Ghosh | |
| 2011/0107135 A1 | 5/2011 | Andrews | |
| 2011/0131663 A1* | 6/2011 | Kaikuranta | G06F 3/0486 726/28 |
| 2011/0161289 A1 | 6/2011 | Pei | |
| 2011/0179231 A1 | 7/2011 | Roush | |
| 2011/0249552 A1 | 10/2011 | Stokes | |
| 2011/0252192 A1* | 10/2011 | Busch | G06F 17/30519 711/105 |
| 2012/0117157 A1* | 5/2012 | Ristock | G06Q 10/10 709/205 |
| 2012/0158650 A1 | 6/2012 | Andre | |
| 2012/0191642 A1* | 7/2012 | George | G06F 17/30448 707/602 |
| 2012/0198455 A1* | 8/2012 | Lee | G06F 9/5061 718/100 |
| 2012/0215740 A1 | 8/2012 | Vaillant | |
| 2012/0254118 A1 | 10/2012 | Shah | |
| 2012/0297056 A1 | 11/2012 | Lee | |
| 2013/0047165 A1 | 2/2013 | Goetz | |

OTHER PUBLICATIONS

European Patent Office, International Searching Authority, International Search Report and Written Opinion dated Mar. 13, 2015 for International Application No. PCT/US2014/068898, 12 Pages.

* cited by examiner

SYSTEM AND METHOD FOR SUPPORTING SERVICE LEVEL QUORUM IN A DATA GRID CLUSTER

CLAIM OF PRIORITY

This application is a continuation of U.S. patent application Ser. No. 13/352,209, titled SYSTEM AND METHOD FOR SUPPORTING SERVICE LEVEL QUORUM IN A DATA GRID CLUSTER" filed Jan. 17, 2012, which application claims the benefit of priority to U.S. Provisional Patent Application No. 61/437,546, titled "QUORUM IN A DISTRIBUTED DATA GRID", filed Jan. 28, 2011, and which applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer cluster environments, and data and resource management in such environments, and is particularly related to a system and method for supporting service level quorum in a data grid cluster.

BACKGROUND

Modern computing systems, particularly those employed by larger organizations and enterprises, continue to increase in size and complexity. Particularly, in areas such as Internet applications, there is an expectation that millions of users should be able to simultaneously access that application, which effectively leads to an exponential increase in the amount of content generated and consumed by users, and transactions involving that content. Such activity also results in a corresponding increase in the number of transaction calls to databases and metadata stores, which have a limited capacity to accommodate that demand.

In order to meet these requirements, a distributed data management and cache service can be run in the application tier so as to run in-process with the application itself, e.g., as part of an application server cluster. However, there is a need to be able to configure and manage the application server cluster for effectively providing the distributed data management and cache service to the users. These are the generally areas that embodiments of the invention are intended to address.

SUMMARY

In accordance with an embodiment, a system and method is described for use with a data grid cluster, for supporting service level quorum in the data grid cluster. The data grid cluster includes a plurality of cluster nodes that support performing at least one service action. A quorum policy, defined in a cache configuration file associated with the data grid cluster, can specify a minimum number of service members that are required in the data grid cluster for performing the service action. The data grid cluster uses the quorum policy to determine whether the service action is allowed to be performed, based on a present state of the plurality of cluster nodes in the data grid cluster.

DETAILED DESCRIPTION

In accordance with an embodiment, as referred to herein a "data grid cluster", or "data grid", is a system comprising a plurality of computer servers which work together to manage information and related operations, such as computations, within a distributed or clustered environment. The data grid cluster can be used to manage application objects and data that are shared across the servers. Preferably, a data grid cluster should have low response time, high throughput, predictable scalability, continuous availability and information reliability. As a result of these capabilities, data grid clusters are well suited for use in computational intensive, stateful middle-tier applications. Some examples of data grid clusters, e.g., the Oracle Coherence data grid cluster, can store the information in-memory to achieve higher performance, and can employ redundancy in keeping copies of that information synchronized across multiple servers, thus ensuring resiliency of the system and the availability of the data in the event of server failure. For example, Coherence provides replicated and distributed (partitioned) data management and caching services on top of a reliable, highly scalable peer-to-peer clustering protocol, with no single points of failure, and can automatically and transparently fail over and redistribute its clustered data management services whenever a server becomes inoperative or disconnected from the network.

Data Grid Cluster Services

In accordance with an embodiment, the functionality of a data grid cluster is based on using different cluster services. The cluster services can include root cluster services, partitioned cache services, and proxy services. Within the data grid cluster, each cluster node can participate in a number of cluster services, both in terms of providing and consuming the cluster services. Each cluster service has a service name that uniquely identifies the service within the data grid cluster, and a service type, which defines what the cluster service can do. Other than the root cluster service running on each cluster node in the data grid cluster, there may be multiple named instances of each service type. The services can be either configured by the user, or provided by the data grid cluster as a default set of services.

Figure 1:
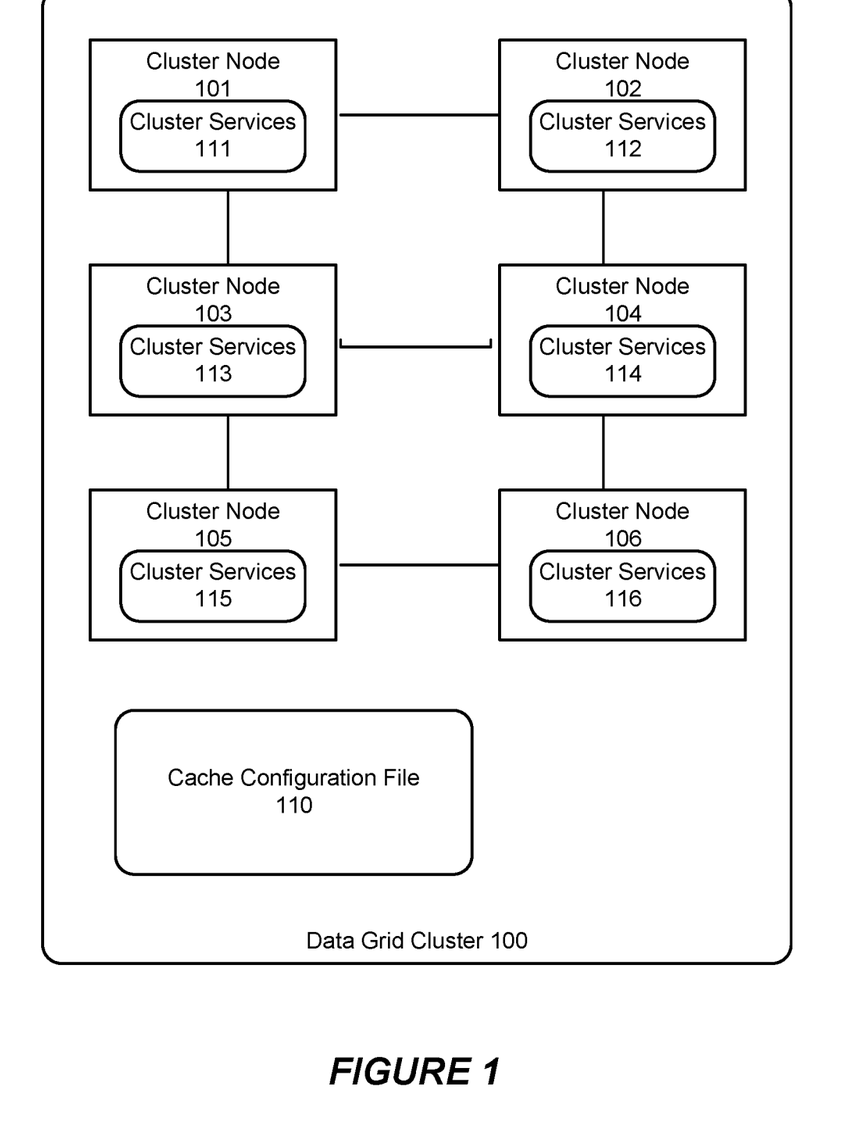
FIG. 1 is an illustration of a data grid cluster, in accordance with various embodiments.

FIG. 1 is an illustration of a data grid cluster in accordance with various embodiments of the invention. As shown in FIG. 1, a data grid cluster 100 includes a plurality of cluster nodes 101-106 having various cluster services 111-116 running thereon. Additionally, a cache configuration file 110 can be used to configure the data grid cluster.

In accordance with various embodiments, servers that store data within the data grid cluster can support a set of quorum features. The quorum features can be used to make decisions on physical resource planning (e.g. server, RAM memory, etc), and to determine how the data grid cluster behaves in the absence of such physical resources. As referred to herein, a quorum refers to the minimum number of service members in a cluster that is required before a particular service action is allowed or disallowed. By way of illustration, during deployment, the physical resources of the data grid cluster can be selected according to a plan that is based on the amount of data and requests that will be processed by the grid. For example, a data grid cluster can have 10 servers with totally 10 gigabytes of random access memory (RAM) for handling the grid computing. However, in the event that a subset of those servers and/or RAM fail, it may be important to implement a system to manage how the data grid cluster will behave in their absence. In accordance with an embodiment, the quorum feature enables the data grid cluster to manage the cluster processing in the event of losing some of those resources.

Service Level Quorum Features

In accordance with an embodiment, the quorum features enable the configuring of the data grid cluster at service level. The service level quorum involves resource planning and provides policies and behaviors per service (e.g. cache writes, proxy connects, distribution, etc) when the data grid cluster physical resources (e.g. number of servers, RAM/cache etc.) are unavailable.

Figure 2:
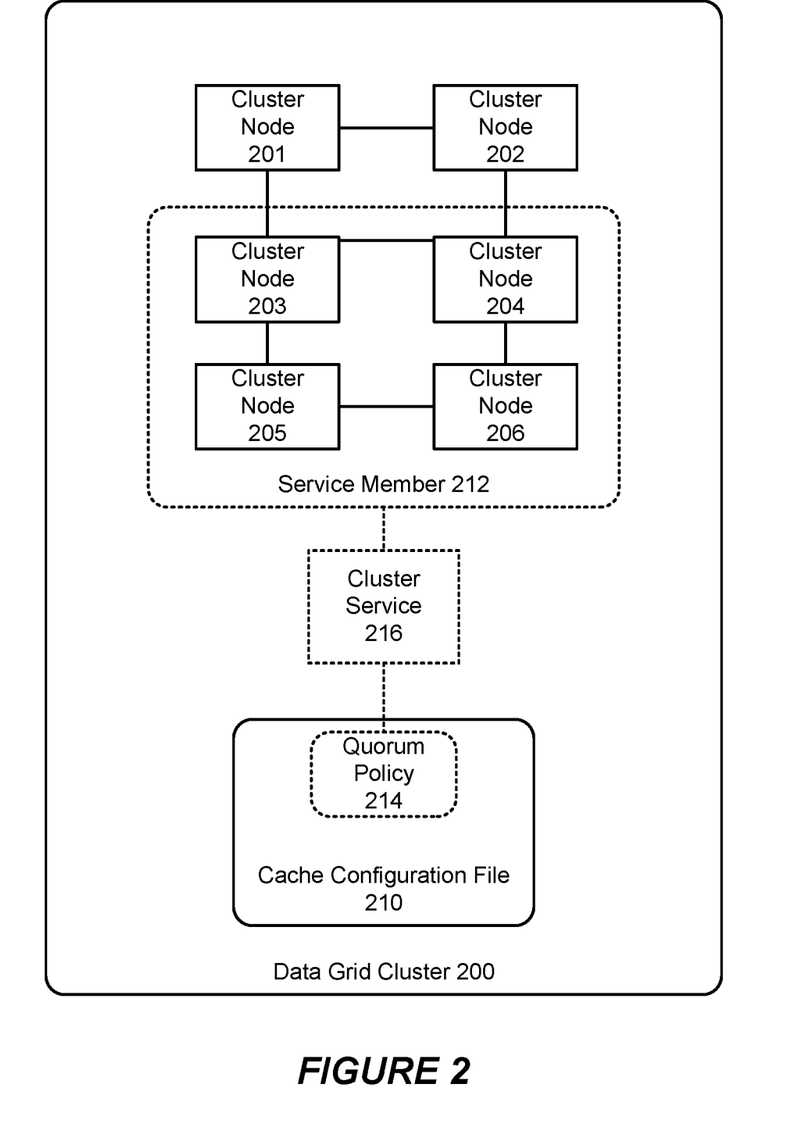
FIG. 2 is an illustration of a data grid cluster that supports service level quorum, in accordance with various embodiments.

FIG. 2 is an illustration of a data grid cluster that supports service level quorum in accordance with various embodiments. As shown in FIG. 2, the data grid cluster 200 provides a cluster service 216, which can be a root cluster service, a partitioned cache service, or a proxy service. The cluster service is supported by service members 212 that include a number of cluster nodes 203-206. The service members can either include every cluster node in the data grid, or a fraction or portion of the data grid. In the example as shown in FIG. 2, cluster nodes 201-202 are not associated with the cluster service 216. Additionally, a quorum policy 214 can be specified in a cache configuration file 210 that is associated with the data grid cluster. The quorum policy, which is stored in one or more cluster nodes in the data grid, can specify the minimum number of service members in a cluster that is required before a particular service action is allowed or disallowed.

Figure 3:
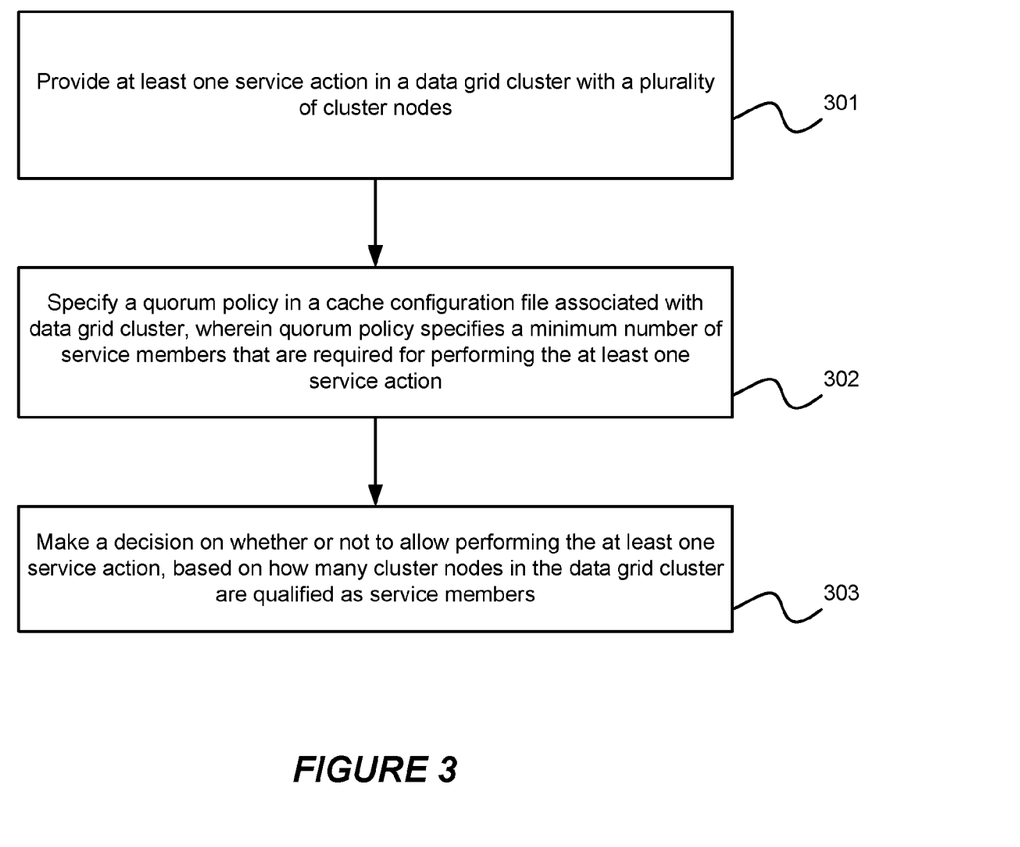
FIG. 3 illustrates an exemplary flow chart for supporting the quorum features in a data grid cluster, in accordance with an embodiment.

FIG. 3 illustrates an exemplary flow chart for supporting service level quorum in a data grid cluster in accordance with an embodiment. As shown in FIG. 3, at step 301, a data grid cluster with a plurality of cluster nodes can support a service action. At step 302, the data grid cluster is associated with a cache configuration file that specifies a quorum policy. The quorum policy specifies a minimum number of service members that are required for performing the service action. At step 303, the data grid cluster can further make a decision on whether or not to allow for performing the service action. Such a decision can be made based on how many cluster nodes in the data grid cluster are qualified as service members that support the service action.

In accordance with an embodiment, quorums can control service behavior at different service member levels, and help ensure an optimal cluster and cache environment for a particular application or solution. The quorum policy can define different types of quorum thresholds that provide benefits with respect to a particular service. Quorums are beneficial because they provide assurances on how a cluster should behave when certain member thresholds (e.g., resource thresholds) are reached.

In accordance with an embodiment, there can be a cluster quorum policy for the root cluster service running on each cluster node in the data grid cluster, a partitioned quorum policy for the partitioned cache service and a proxy quorum policy for the proxy service. Quorum policies can be provided as out of the box membership based policies per service. Additionally, a pluggable interface can be provided for enabling custom policies and behaviors.

Quorum Policies for Root Cluster Services

In accordance with an embodiment, quorum policies for root cluster services, or cluster quorum, can enable management of cluster/machine network membership. For example, the cluster quorum can control the ability of a machine to join and become a member of the cluster and get evicted from the cluster. In accordance with an embodiment, the cluster quorum can control what happens when members connect to the cluster, and when members leave the cluster. A root cluster service is automatically started when a cluster node joins a cluster, and typically there is exactly one root cluster service running on each cluster node. The root cluster service keeps track of the membership and services in the cluster. For example, the root cluster service is responsible for detecting other cluster nodes, monitoring the failure or death of other cluster nodes, and can be responsible for registering the availability of other services in the cluster.

Figure 4:
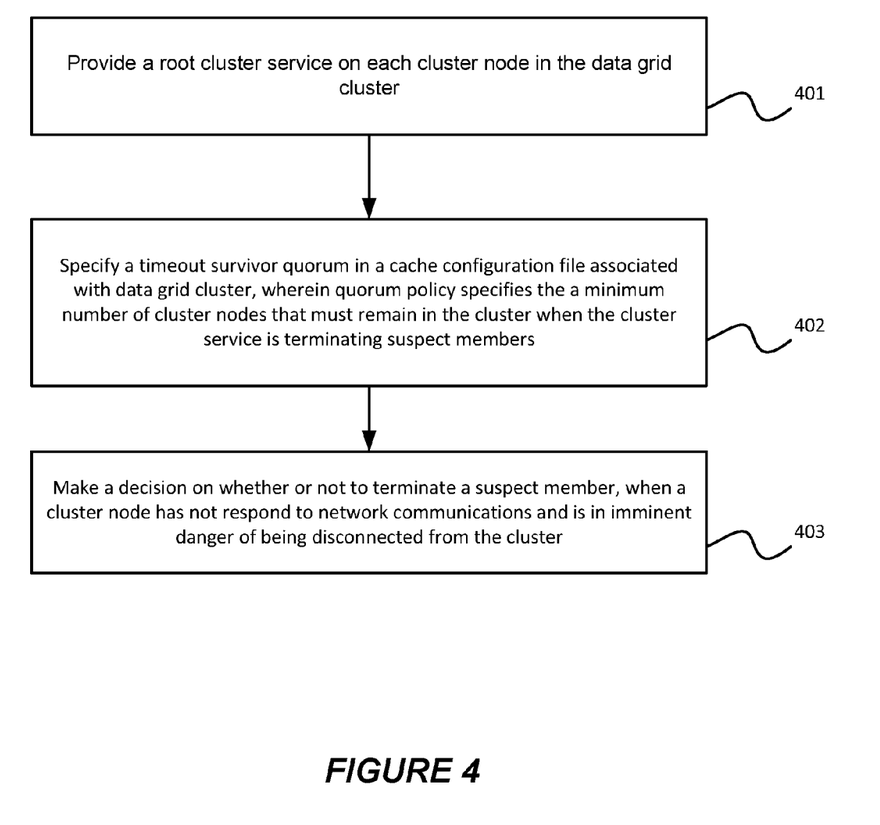
FIG. 4 illustrates an exemplary flow chart for supporting cluster quorum features in a data grid cluster, in accordance with an embodiment.

FIG. 4 illustrates an exemplary flow chart for supporting cluster quorum features in a data grid cluster in accordance with an embodiment. As shown in FIG. 4, at step 401, a data grid cluster can run a root cluster service on each cluster node in the system. At step 402, cache configuration file associated with the data grid cluster can specify a timeout survivor quorum. The timeout survivor quorum can specify a minimum number of cluster nodes that must remain in the cluster when the root cluster service is terminating suspect members. Then, at step 403, the data grid cluster can make a decision on whether or not to terminate a suspected cluster member. A cluster node is considered a suspect cluster member when it has not responded to network communications, and is in imminent danger of being disconnected from the cluster.

The cluster quorum feature is useful in environments where network performance varies. For example, in some environments intermittent network outages may cause a high number of cluster members to be removed from the cluster. Using the cluster quorum, a certain number of members can be maintained during the outage, and will be available once the network recovers. This behavior also minimizes the manual intervention required to restart members. Naturally, requests that require cooperation by the nodes that are not responding will not be able to complete, and will be either blocked for the duration of the outage or will be timed out.

In accordance with an embodiment, the cluster quorum can be specified generically across all members or constrained to members that have a specific role in the cluster, such as client or server members. In one embodiment, a <role-name> element in "member-identity" section of a cache configuration file can be used to define role names for cluster members. A timeout survivor quorum threshold can be configured in an operational override file using the <timeout-survivor-quorum> element and optionally the role attribute. This element can be used within a <cluster-quorum-policy> element. Listing 1 illustrates configuring the timeout survivor quorum threshold to ensure that 5 cluster members with the server role are always kept in the cluster while removing suspect members, in accordance with an embodiment.

Listing 1

```
<cluster-config>
    <member-identity>
        <role-name>server</role-name>
    </member-identity>
    <cluster-quorum-policy>
        <timeout-survivor-quorum
        role="Server">5</timeout-survivor-quorum>
    </cluster-quorum-policy>
</cluster-config>
```

Quorum Policies for Partitioned Cache Services

In accordance with an embodiment, quorums can be used by the distributed data management system to support partitioned cache services. For example, a partitioned cache backup quorum can require at least five storage-enabled members before the partitioned cache service is allowed to back up partitions.

Figure 5:
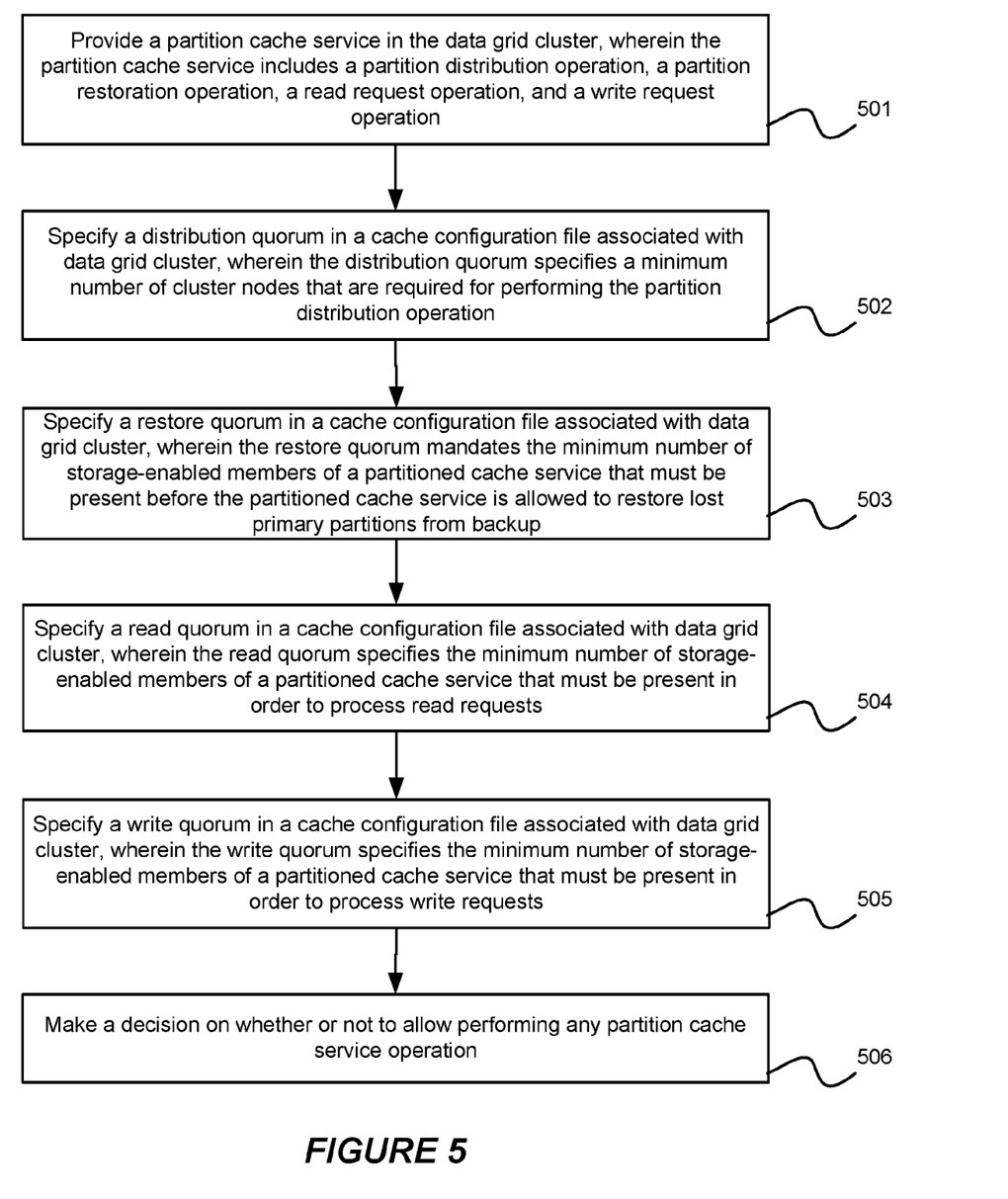
FIG. 5 illustrates an exemplary flow chart for supporting partitioned cache quorum features in a data grid cluster, in accordance with an embodiment.

FIG. 5 illustrates an exemplary flow chart for supporting partitioned cache quorum features in a data grid cluster in accordance with an embodiment. As shown in FIG. 5, at step 501, a data grid cluster can support a partition cache service. The partition cache service includes a partition distribution operation, a partition restoration operation, a read request operation, and a write request operation. The data grid cluster can specify different partitioned cache quorum policies for different types of partitioned cache services, at steps 502-505. These different types of quorums mandate how many service members are required before different partitioned cache service operations can be performed. At step 506, the data grid cluster can make a decision on whether or not to allow performing any partition cache service operation. At step 502, the data grid cluster can specify a distribution quorum in the cache configuration file. The distribution quorum mandates the minimum number of storage-enabled members of a partitioned cache service that must be present before the partitioned cache service is allowed to perform a partition distribution operation. At step 503, the data grid cluster can specify a restore quorum in the cache configuration file. The restore quorum mandates the minimum number of storage-enabled members of a partitioned cache service that must be present before the partitioned cache service is allowed to restore lost primary partitions from backup. At step 504, the data grid cluster can specify a read quorum in the cache configuration file. The read quorum specifies the minimum number of storage-enabled members of a partitioned cache service that must be present in order to process read requests. A read request is any request that does not mutate the state or contents of a cache. At step 505, the data grid cluster can specify a write quorum in the cache configuration file. The write quorum specifies the minimum number of storage-enabled members of a partitioned cache service that must be present in order to process write requests. A write request is any request that may mutate the state or contents of a cache.

As described above, the different quorums can be used to indicate at what service member levels the different service operations are best performed, given the intended usage and requirements of a distributed cache. For example, a small distributed cache may only require three storage-enabled members to adequately store data and handle projected request volumes, while a large distributed cache may require ten or more storage-enabled members to adequately store data and handle projected request volumes. Optimal member levels can be tested during development and then set accordingly to ensure that the minimum service member levels are provisioned in a production environment.

Some considerations include that, if the number of storage-enabled nodes running the service drops below the configured level of read or write quorum, then the corresponding client operation is rejected and an exception thrown. If the number of storage-enabled nodes drops below the configured level of distribution quorum, some data can become "endangered," or without backup until the quorum is reached. Additionally, dropping below the restore quorum can cause an operation to be blocked until the quorum is reached; otherwise, the operation will be timed out.

In accordance with an embodiment, partitioned cache quorums can be configured in a cache configuration file within the <partitioned-quorum-policy-scheme> element. The element can be used within a <distributed-scheme> element. Listing 2 illustrates configuring thresholds for the partitioned cache quorums, in accordance with an embodiment. In one embodiment, the threshold values indicate the minimum amount of service members that are required to perform the operation.

Listing 2

```
<caching-schemes>
    <distributed-scheme>
        <scheme-name>partitioned-cache-with-quorum</scheme-name>
        <service-name>PartitionedCacheWithQuorum</service-name>
        <backing-map-scheme>
            <local-scheme/>
        </backing-map-scheme>
        <partitioned-quorum-policy-scheme>
            <restore-quorum>3</restore-quorum>
            <distribution-quorum>4</distribution-quorum>
            <read-quorum>3</read-quorum>
            <write-quorum>5</write-quorum>
        </partitioned-quorum-policy-scheme>
        <autostart>true</autostart>
    </distributed-scheme>
```

The <partitioned-quorum-policy-scheme> element also supports using scheme references. As illustrated in the embodiment shown in Listing 3, a <partitioned-quorum-policy-scheme>, with the name partitioned-cache-quorum, can be referenced from within the <distributed-scheme> element.

Listing 3

```
<caching-schemes>
    <partitioned-quorum-policy-scheme>
        <scheme-name>partitioned-cache-quorum</scheme-name>
        <restore-quorum>3</restore-quorum>
        <distribution-quorum>4</distribution-quorum>
        <read-quorum>3</read-quorum>
        <write-quorum>5</write-quorum>
```

Listing 3

```
</partitioned-quorum-policy-scheme>
<distributed-scheme>
    <scheme-name>partitioned-cache-with-quorum</scheme-name>
    <service-name>PartitionedCacheWithQuorum</service-name>
    <backing-map-scheme>
        <local-scheme/>
    </backing-map-scheme>
    <partitioned-quorum-policy-scheme>
        <scheme-ref>partitioned-cache-quorum</scheme-ref>
    </partitioned-quorum-policy-scheme>
    <autostart>true</autostart>
</distributed-scheme>
```

Quorum Policies for Proxy Services

In accordance with an embodiment, a proxy service can be used in a data grid cluster when it is desirable to have clients running outside the cluster. For example, the proxy service can be used in those cases where there may be thousands of client processes, where the clients are not running on the Java platform, or where a greater degree of coupling is desired. In one embodiment, the proxy service allows connections, for example TCP connections, from clients that run outside the cluster to the data grid.

Figure 6:
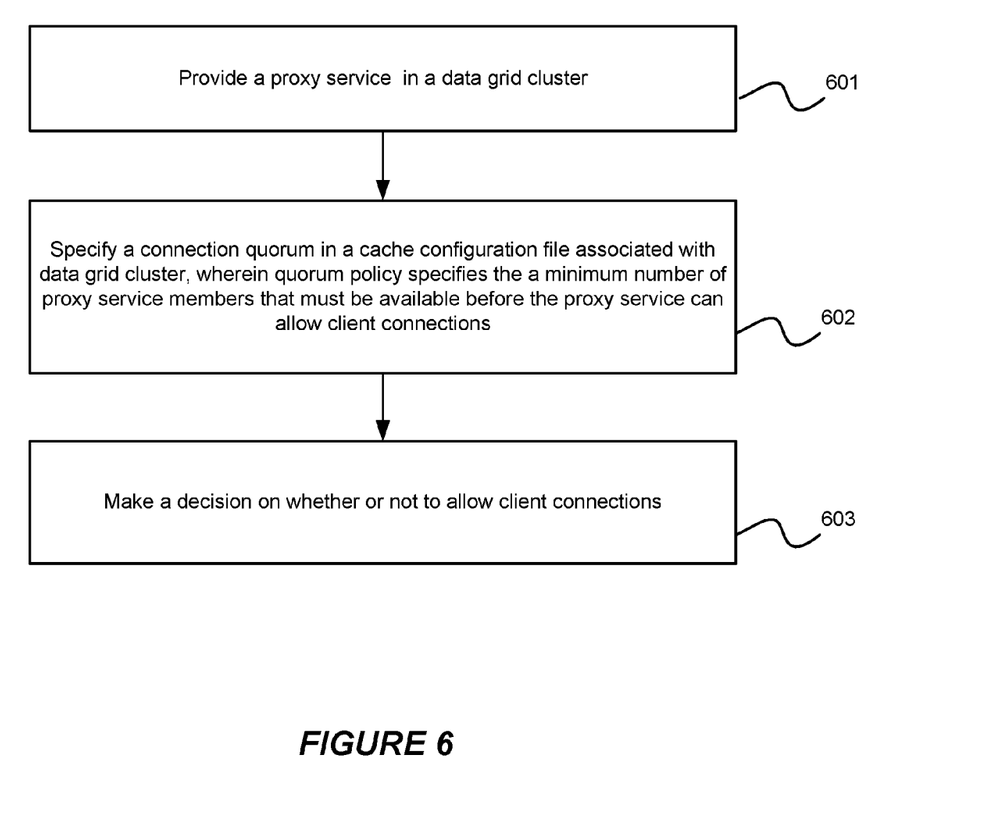
FIG. 6 illustrates an exemplary flow chart for supporting proxy quorum features in a data grid cluster, in accordance with an embodiment.

FIG. 6 illustrates an exemplary flow chart for supporting proxy quorum features in a data grid cluster in accordance with an embodiment. As shown in FIG. 6, at step 601, a data grid cluster can support a proxy service. At step 602, a cache configuration file associated with the data grid cluster can specify a proxy quorum. The proxy quorum policy defines a connection quorum for the proxy service. The connection quorum mandates the minimum number of proxy service members that must be available before the proxy service can allow client connections. Then, at step 603, the data grid cluster can make a decision on whether or not to allow client connection.

In accordance with an embodiment, the proxy quorum can be used to ensure enough proxy service members are available to optimally support a given set of TCP clients. For example, a small number of clients may efficiently connect to a cluster using two proxy services, while a large number of clients may require three or more proxy services to efficiently connect to a cluster. Optimal levels can be tested during development and then set accordingly to ensure that the minimum service member levels are provisioned in a production environment.

In accordance with an embodiment, a connection quorum threshold can be configured in a <proxy-quorum-policy-scheme> element in the cache configuration file. The element can be used within a <proxy-scheme> element. Listing 4 illustrates configuring the connection quorum threshold to ensure that three proxy service members are present in the cluster before the proxy service is allowed to accept TCP client connections, in accordance with an embodiment.

Listing 4

```
<caching-schemes>
    <proxy-scheme>
        <scheme-name>proxy-with-quorum</scheme-name>
        <service-name>TcpProxyService</service-name>
        <acceptor-config>
            <tcp-acceptor>
                <local-address>
                    <address>localhost</address>
                    <port>32000</port>
```

Listing 4

```
                </local-address>
            </tcp-acceptor>
        </acceptor-config>
        <autostart>true</autostart>
        <proxy-quorum-policy-scheme>
            <connect-quorum>3</connect-quorum>
        </proxy-quorum-policy-scheme>
    </proxy-scheme>
```

The <proxy-quorum-policy-scheme> element also supports using scheme references. As illustrated in the embodiment shown in Listing 5, a <proxy-quorum-policy-scheme>, with the name proxy-quorum, is referenced from within the <proxy-scheme> element.

Listing 5

```
<caching-schemes>
    <proxy-quorum-policy-scheme>
        <scheme-name>proxy-quorum</scheme-name>
        <connect-quorum>3</connect-quorum>
    </proxy-quorum-policy-scheme>
    <proxy-scheme>
        <scheme-name>proxy-with-quorum</scheme-name>
        <service-name>TcpProxyService</service-name>
        <acceptor-config>
            <tcp-acceptor>
                <local-address>
                    <address>localhost</address>
                    <port>32000</port>
                </local-address>
            </tcp-acceptor>
        </acceptor-config>
        <autostart>true</autostart>
        <proxy-quorum-policy-scheme>
            <scheme-ref>proxy-quorum</scheme-ref>
        </proxy-quorum-policy-scheme>
    </proxy-scheme>
```

Enabling Custom Action Policies

In accordance with an embodiment, custom action policies can be used instead of the default quorum policies, in order to support different cluster services in the data grid. The custom policies specified in user applications can incorporate arbitrary external states to provide fine grained resource-driven control of the services, since the user applications are in the best position to manage these external states.

Figure 7:
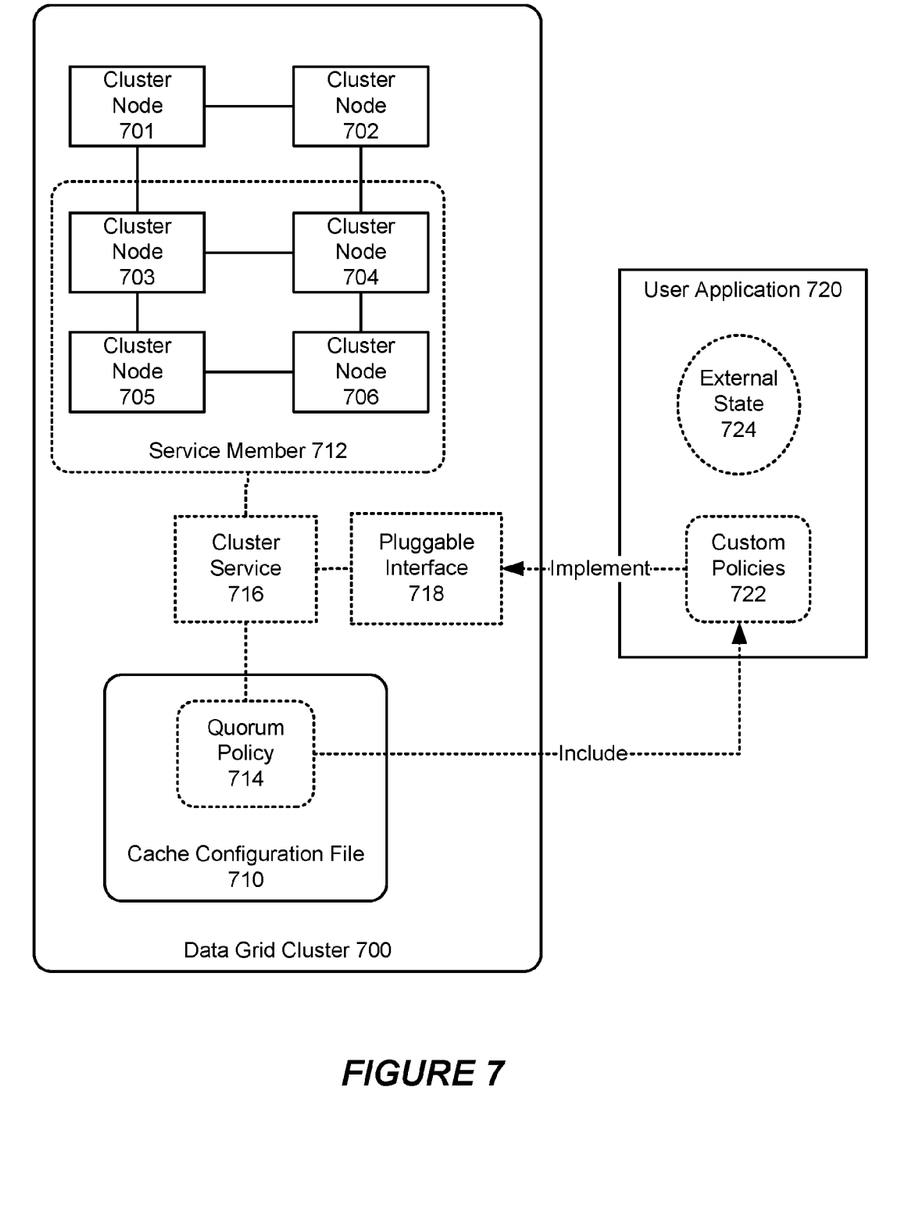
FIG. 7 is an illustration of a data grid cluster that supports custom action policies, in accordance with various embodiments of the invention.

FIG. 7 is an illustration of a distributed data management system that supports custom action policies in accordance with various embodiments of the invention. As shown in FIG. 7, a quorum policy 714 can be specified in a cache configuration file 710 that is associated with a data grid cluster 700. The quorum policy can include and/or refer to custom policies 722 managed by a user application 720. The custom policies implement a pluggable interface 718 associated with a cluster service 716 that is supported by service members 712, which includes cluster nodes 703-706 in the data grid cluster. Additionally, the user application allows the custom policies to incorporate in different external states 724, such as user application deployment topology in formation in the data grid cluster.

In accordance with an embodiment, the pluggable interface allows the users to implement custom policies to control the behaviors and features of a data grid cluster. One exemplary pluggable interface is a com.tangosol.net.ActionPolicy interface, provided in the Oracle Coherence data grid cluster.

In accordance with an embodiment, users can specify different types of custom action policies for a data grid. One exemplary custom action policy defines that cache requests are disallowed during a weekly maintenance window for the data grid cluster. Another exemplary custom action policy is a resource-driven policy that allows no write operations unless a database is available. Another exemplary use case allows a user to define externally-triggered policies that make the data grid cluster available unless certain external event happens. For example, the custom action policy can specify that "Start a cluster, and immediately preload data into the cache. Until this process completes, do not allow cache requests."

Figure 8:
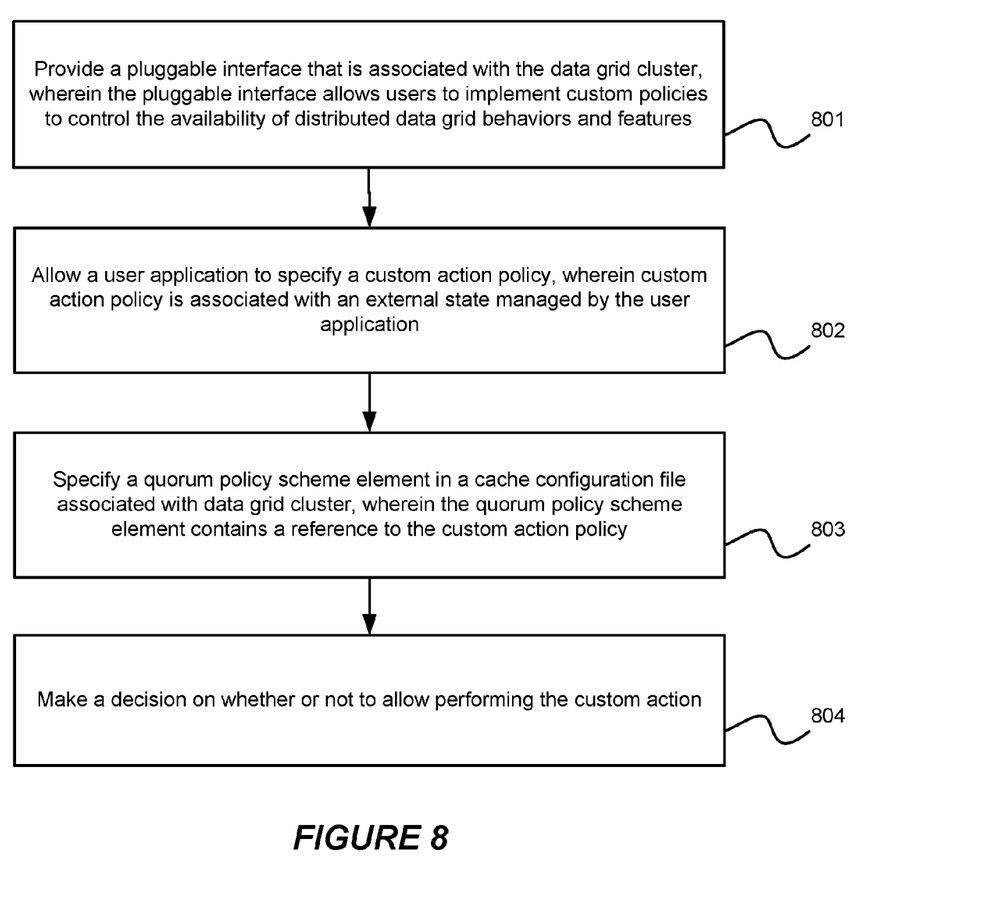
FIG. 8 illustrates an exemplary flow chart for supporting custom action policies in a data grid cluster, in accordance with an embodiment.

FIG. 8 illustrates an exemplary flow chart for supporting custom action policies in a data grid cluster in accordance with an embodiment. As shown in FIG. 8, at step 801, a data grid cluster can provide a pluggable interface that is associated with the data grid cluster. The pluggable interface allows users to implement custom policies to control the behaviors and features of the data grid cluster. At step 802, user applications can specify a custom action policy by implementing the pluggable interface. The custom action policy is associated with an external state managed by the user application. At step 803, the data grid cluster can specify a quorum policy scheme element in a cache configuration file. Here, the quorum policy scheme element contains a reference to the custom action policy defined in the user applications. Then, the data grid cluster can make a decision on whether or not to allow performing custom action, at step 804.

In accordance with an embodiment, to enable a custom policy, a <class-name> element can be added within a quorum policy scheme element in the cache configuration file. The <class-name> element contains the fully qualified name of the implementation class. Listing 6 adds a custom action policy to the partitioned quorum policy for a distributed cache scheme definition:

Listing 6

```
<caching-schemes>
    <distributed-scheme>
        <scheme-name>partitioned-cache-with-quorum</scheme-name>
        <service-name>PartitionedCacheWithQuorum</service-name>
        <backing-map-scheme>
            <local-scheme/>
        </backing-map-scheme>
        <partitioned-quorum-policy-scheme>
            <class-name>package.MyCustomAction</class-name>
        </partitioned-quorum-policy-scheme>
        <autostart>true</autostart>
    </distributed-scheme>
```

As an alternative, a factory class can be used to create custom action policy instances. Listing 7 defines a factory class, that uses an <class-factory-name> element to enter the fully qualified class name and the <method-name> element to specify the name of a static factory method on the factory class, which will perform, object instantiation, in accordance with an embodiment.

Listing 7

```
<caching-schemes>
    <distributed-scheme>
        <scheme-name>partitioned-cache-with-quorum</scheme-name>
        <service-name>PartitionedCacheWithQuorum</service-name>
```

-continued

Listing 7

```
        <backing-map-scheme>
            <local-scheme/>
        </backing-map-scheme>
        <partitioned-quorum-policy-scheme>
            <class-factory-name>package.Myfactory</class-name>
            <method-name>createPolicy<method-name>
        </partitioned-quorum-policy-scheme>
        <autostart>true</autostart>
    </distributed-scheme>
```

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for supporting service level quorum in a data grid cluster, comprising:
   a plurality of computer servers, the data grid cluster executing thereon, wherein the data grid cluster comprises a plurality of interoperating cluster nodes in the data grid cluster, wherein the data grid cluster supports performing a plurality of services including a root cluster service performed by all of the plurality of interoperating cluster nodes, and at least one other cluster service performed by at least one of the plurality of interoperating cluster nodes specified as a service member of the at least one other cluster service, and wherein the at least one other cluster service provides a different type of service than the root cluster service;
   a root cluster service quorum policy, wherein the root cluster service quorum policy specifies a minimum number of qualified root cluster service members that are required for performing root cluster service actions of said root cluster service;
   a cache configuration file associated with the data grid cluster, the cache configuration file accessible to all of the plurality of interoperating cluster nodes and including:
      a service name element for a first cluster service of the at least one other cluster service that uniquely identifies a name of the first cluster service; and
      a quorum policy scheme element that contains a reference to a custom action policy for the first cluster service of the at least one other cluster service, the custom action policy specified in a user application;
   wherein the data grid cluster uses the root cluster service quorum policy to determine whether root service actions are allowed to be performed based on how many qualified root cluster service members are operational in said plurality of interoperating cluster nodes in the data grid cluster; and
   wherein the custom action policy specified in the user application provides resource-driven control of the first cluster service, wherein the resource-driven control is provided by the custom action policy to the first cluster service via a pluggable interface provided by the data grid cluster and implemented by the user application, and wherein the resource-driven control is based on an external state managed by the user application.

2. The system according to claim 1, wherein the pluggable interface is a com.tangosol.net.ActionPolicy pluggable interface, and wherein the data grid cluster is an ORACLE COHERENCE data grid cluster.

3. The system according to claim 1, wherein the external state is a deployment topology of the user application within the data grid cluster.

4. The system of claim 1, wherein the first cluster service of the at least one other cluster service is a partitioned cache service.

5. The system of claim 1, wherein a class-name element is present within the quorum policy scheme element, and wherein the class name element contains a fully qualified name of a class that implements the custom action policy.

6. The system of claim 5, wherein the class that implements the custom action policy is a factory class.

7. The system of claim 6, wherein a method name element is present within the quorum policy scheme element, and wherein the method name element specifies the name of a static factory method on the factory class that performs instantiation of an object of the class.

8. A method for supporting service level quorum in a data grid cluster comprising a plurality of computer servers, the data grid cluster executing thereon, wherein the data grid cluster comprises a plurality of interoperating cluster nodes in the data grid cluster, wherein the data grid cluster supports performing a plurality of services including a root cluster service performed by all of the plurality of interoperating cluster nodes and at least one other cluster service performed by at least one of the plurality of interoperating cluster nodes specified as a service member of the at least one other cluster service, and wherein the at least one other cluster service provides a different type of service than the root cluster service, the method comprising:
   providing a root cluster service quorum policy, wherein the root cluster service quorum policy specifies a minimum number of qualified root cluster service members that are required for performing root cluster service actions of said root cluster service;
   providing a cache configuration file;
   associating the cache configuration file with the data grid cluster such that the cache configuration file is accessible to all of the plurality of interoperating cluster nodes;
   defining, in the cache configuration file, a service name element for a first cluster service of the at least one other service, the service name element uniquely identifying a name of the first cluster service;
   defining, in the cache configuration file, a quorum policy scheme element that contains a reference to a custom action policy for the first cluster service of the at least one other cluster service, the custom action policy specified in a user application;
   using the root cluster service quorum policy to determine whether root cluster service actions are allowed to be performed based on how many qualified root cluster service members are operational in said plurality of interoperating cluster nodes in the data grid cluster; and
   using the custom action policy specified in the user application to provide resource-driven control of the first cluster service
   providing, by the data grid cluster, a pluggable interface;
   implementing, by the user application, the pluggable interface;
   providing the resource-driven control via the pluggable interface implemented by the user application; and
   basing the resource-driven control on an external state managed by the user application.

9. The method of claim 8, wherein the pluggable interface is a com.tangosol.net.ActionPolicy pluggable interface, and wherein the data grid cluster is an ORACLE COHERENCE data grid cluster.

10. The method of claim 8, wherein the external state is a deployment topology of the user application within the data grid cluster.

11. The method of claim 8, wherein the first cluster service of the at least one other cluster service is a partitioned cache service.

12. The method of claim 8, further comprising:
   providing a class-name element within the quorum policy scheme element, wherein the class name element contains a fully qualified name of a class that implements the custom action policy.

13. The method of claim 12, wherein the class that implements the custom action policy is a factory class.

14. The method of claim 13, further comprising:
   providing a method name element within the quorum policy scheme element, wherein the method name element specifies the name of a static factory method on the factory class that performs instantiation of an object of the class.

15. A non-transitory machine readable medium having instructions stored thereon for supporting service level quorum in a data grid cluster comprising a plurality of computer servers, the data grid cluster executing thereon, wherein the data grid cluster comprises a plurality of interoperating cluster nodes in the data grid cluster, wherein the data grid cluster supports performing a plurality of services including a root cluster service performed by all of the plurality of interoperating cluster nodes and at least one other service performed by at least one of the plurality of interoperating cluster nodes specified as a service member of the at least one other cluster service, and wherein the at least one other cluster service provides a different type of service than the root cluster service, which instructions, when executed cause the data grid cluster to perform steps comprising:

providing a root cluster service quorum policy, wherein the root cluster service quorum policy specifies a minimum number of qualified root cluster service members that are required for performing root cluster service actions of said root cluster service;

providing a cache configuration file;

associating the cache configuration file with the data grid cluster such that the cache configuration file is accessible to all of the plurality of interoperating cluster nodes;

defining, in the cache configuration file, a service name element for a first cluster service of the at least one other cluster service, the service name element uniquely identifying a name of the first cluster service;

defining, in the cache configuration file, a quorum policy scheme element that contains a reference to a custom action policy for the first cluster service of the at least one other cluster service, the custom action policy specified in a user application;

using the root cluster service quorum policy to determine whether root cluster service actions are allowed to be performed based on how many qualified root cluster service members are operational in said plurality of interoperating cluster nodes in the data grid cluster; and using the custom action policy specified in the user application to provide resource-driven control of the first cluster service providing, by the data grid cluster, a pluggable interface;

implementing, by the user application, the pluggable interface;

providing the resource-driven control via the pluggable interface implemented by the user application; and basing the resource-driven control on an external state managed by the user application.

16. The non-transitory machine readable medium of claim 15, wherein the external state is a deployment topology of the user application within the data grid cluster.

17. The non-transitory machine readable medium of claim 15, wherein the first cluster service of the at least one other cluster service is a partitioned cache service.

18. The non-transitory machine readable medium of claim 15, further comprising:

providing a class-name element within the quorum policy scheme element, wherein the class name element contains a fully qualified name of a class that implements the custom action policy.

19. The non-transitory machine readable medium of claim 18, wherein the class that implements the custom action policy is a factory class.

20. The non-transitory machine readable medium of claim 19, further comprising:

providing a method name element within the quorum policy scheme element, wherein the method name element specifies the name of a static factory method on the factory class that performs instantiation of an object of the class.

* * * * *

UNITED STATES PATENT AND TRADEMARK OFFICE
CERTIFICATE OF CORRECTION

PATENT NO. : 10,122,595 B2
APPLICATION NO. : 14/984648
DATED : November 6, 2018
INVENTOR(S) : Robert H. Lee et al.

It is certified that error appears in the above-identified patent and that said Letters Patent is hereby corrected as shown below:

On the Title Page

Item (73), Assignee: delete "Orcale International Corporation" and insert --Oracle International Corporation--

Signed and Sealed this
Twenty-seventh Day of August, 2019

Andrei Iancu
*Director of the United States Patent and Trademark Office*